Figure 1:
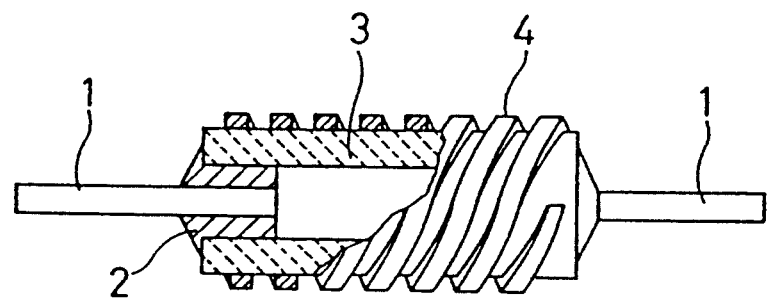

United States Patent [19]
Ishiguro et al.

[11] Patent Number: 5,300,916
[45] Date of Patent: Apr. 5, 1994

[54] SENSOR ELEMENT FOR A THERMAL TYPE FLOWMETER

[75] Inventors: Fujio Ishiguro; Hiroshi Nakajima, both of Nagoya, Japan

[73] Assignee: NGK Insulators, Ltd., Japan

[21] Appl. No.: 998,672

[22] Filed: Dec. 30, 1992

[30] Foreign Application Priority Data

Feb. 18, 1992 [JP] Japan ................... 4-30899

[51] Int. Cl.$^5$ .................... H01C 1/02; H01C 3/00
[52] U.S. Cl. ...................... 338/25; 338/269; 338/270; 338/275
[58] Field of Search ............ 338/25, 28, 22 R, 225 D, 338/267, 268, 269, 270, 273, 275

[56] References Cited

U.S. PATENT DOCUMENTS

| | | | |
|---|---|---|---|
| 4,361,597 | 11/1982 | Arima et al. | 427/53.1 |
| 4,513,615 | 4/1985 | Sato et al. | 73/204 |
| 5,020,214 | 6/1991 | Tsuruoka et al. | |

Primary Examiner—Marvin M. Lateef
Attorney, Agent, or Firm—Parkhurst, Wendel & Rossi

[57] ABSTRACT

A sensor element for a thermal type flowmeter including a ceramic substrate, a thin film, resistor of platinum provided on the outer surface of the ceramic substrate and an outer protective layer of glass provided for protecting the resistor. The glass contains $Na_2O$ and $K_2O$ in a total amount of up to 3 mol %. The sensor element has a temperature coefficient of resistance approximate to the bulk value of platinum, and can be fabricated with little variation.

2 Claims, 3 Drawing Sheets

Total $Na_2O$ and $K_2O$ content in glass

SENSOR ELEMENT FOR A THERMAL TYPE FLOWMETER

BACKGROUND OF THE INVENTION

The present invention relates generally to a sensor element that is primarily used for a thermal type flowmeter for measuring the flow rates of fluids, especially a gas such as air, and more specifically relates to such a sensor element that is excellent in functional properties such as a temperature coefficient of resistance.

A thermal type flowmeter is designed to measure the flow rate of a fluid by making use of the fact that the quantity of heat which is taken away from an electrically heated, heat-generating resistor by a surrounding fluid is variable due to the flow rate of that fluid. A sensor element used for this thermal type flowmeter is broken down into two types, one being the above-mentioned heat-generating resistor and the other a resistor for sensing the temperature of a fluid.

These sensor elements are required to have a large yet stable temperature coefficient of resistance; a resistance value as low as 5 to 30 Ω for the heat-generating resistor; and a resistance value as high as 100 to 1,000 Ω for the temperature-measuring resistance. These sensor elements are also required to have a low heat capacity as and respond quickly to the flow rate and temperature of a fluid.

A known example of the sensor element is an alumina pipe of 0.5 mm in diameter and 2 mm in length, with a platinum wire of 20 μm in diameter wound there around. While this temperature coefficient of resistance is stable at a high value close to the bulk value of platinum due to the use of the platinum wire, this resistance value is low due to some limitation on the diameter of the platinum wire.

In order to overcome the problem mentioned above, it has been proposed to use a spirally wound thin film of platinum as a sensor element. However, a problem with the thin film of platinum is that its temperature coefficient of resistance is not only low but deviates largely as well, because it is likely to be affected by its production process and impurities.

A primary object of the invention, therefore, is to provide a sensor element that has a resistance value capable of being increased, as desired, and a large yet stable temperature coefficient of resistance and can be easily fabricated.

SUMMARY OF THE INVENTION

According to the invention, the object mentioned above is achieved by the provision of a sensor element for a thermal type flowmeter, which comprises a ceramic substrate, a thin film resistor of platinum provided on the outer surface of said ceramic substrate and a protective layer of glass that is provided for protecting said resistor, characterized in that said glass contains $Na_2O$ and $K_2O$ in a total amount of up to 3 mol %.

Preferably, the glass contains $ZnO$ and $B_2O_3$ as main ingredients and has a softening point of 550° C. to 750° C. inclusive.

Preferably, the protective layer formed of the glass has a thickness of 5 μm to 50 μm.

BRIEF DESCRIPTION OF THE INVENTION

Figure 2:
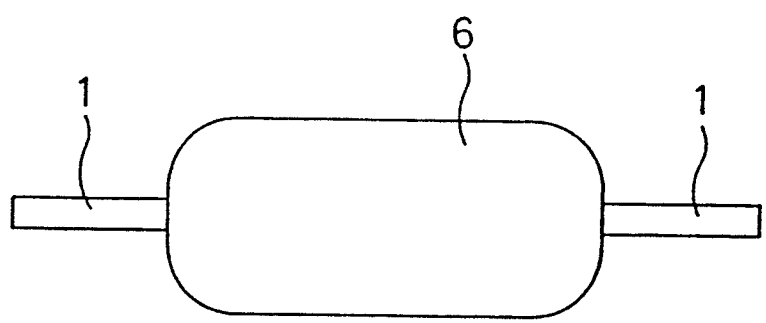
Figure 3:
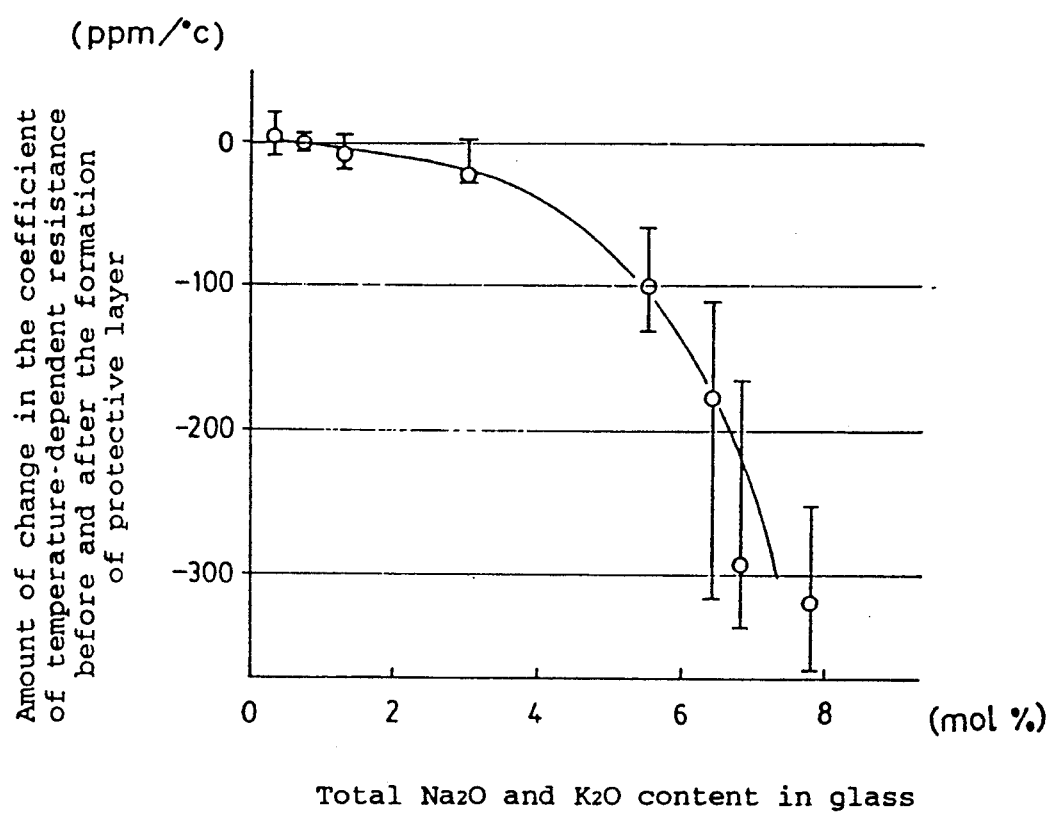
Figure 4:
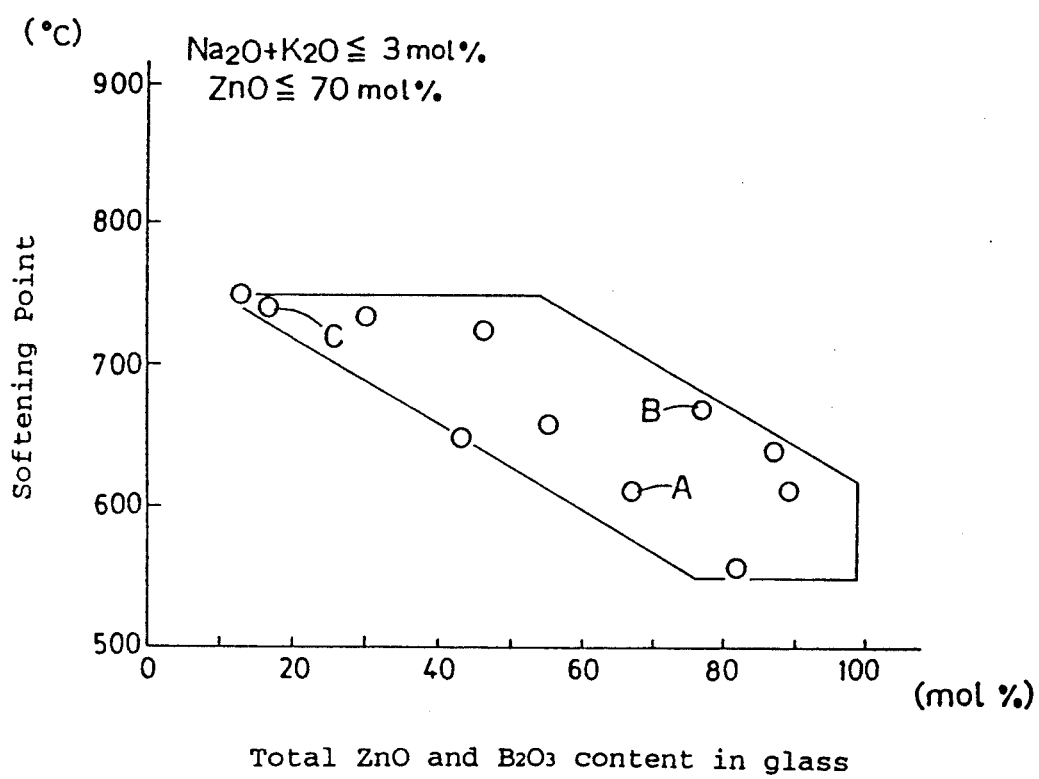

The present invention will now be explained, by way of example but not by way of limitation, with reference to the accompanying drawings, in which:

FIG. 1 is a partly cut-away, schematic view of a sensor element of the invention that is not provided with a glass protective layer, FIG. 2 is a schematic, plan view of a sensor element of the invention that is provided with a glass protective layer, FIG. 3 represents the relation between the total content of $Na_2O$ and $K_2O$ in the glass and the amount of change $\Delta\alpha$ in the temperature coefficient of resistance before and after the formation of the protective layer, and FIG. 4 illustrates the relation between the total content of $ZnO$ and $B_2O_3$ in the glass and the softening point of the glass.

DETAILED EXPLANATION OF THE INVENTION

In the sensor element of the invention that makes use of a thin platinum film, the ceramic substrate is provided on the outer surface with a thin platinum film, which is in turn coated with a glass material excellent in thermal conductivity. The reason is that, when electrically heated, the sensor element is unlikely to degrade due to heat, and provides smooth heat exchange with a fluid, so that it can respond thereto promptly. This glass, when melted temporarily by the heat treatment applied for coating, penetrates into pores in the thin platinum film to make a firm bond between the ceramic substrate and the thin platinum film. After melting, the class solidifies with a relatively uniform thickness. When a glass material having a total $Na_2O$ and $K_2O$ content of up to 3 mol % is used as the glass, the resulting sensor element is allowed to have a temperature coefficient of resistance that is approximate to the bulk value of platinum, and can be fabricated with little deviation.

When the protective layer formed of the glass mentioned above has a thickness of 5 to 50 μm, preferably 5 to 30 μm, it is possible to obtain a sensor element that is well compromised between responsibility and durability.

$Na_2O$ and $K_2O$ in the glass serve to separate oxygen at the grain boundaries in the thin platinum film. That oxygen combines with platinum to form a platinum oxide layer and, at the same time, the reduced Na and K form solid solutions with platinum. These are presumed to lower the temperature coefficient of resistance of the sensor element. It is also presumed that the regulation of $Na_2O+K_2O$ to 3 mol % or below would reduce the amounts of the platinum oxide and solid solutions to such an extent that they have little or no influence on the temperature coefficient of resistance, so that the temperature coefficient of resistance can be kept at a high value. Optionally and preferably in some cases, the amounts of $Na_2O$ and $K_2O$ in the vicinity of the thin platinum film are reduced as much as possible, and the protective layer or a glass material having an increased $Na_2O$ and $K_2O$ content which is of well-enough durability or, in other words, is unlikely to be deposited with dust, etc., is used on the side exposed to a fluid.

The glass having a controlled amount of alkaline components, for instance, glass containing $ZnO$ and $B_2O_3$ in large amounts or as main ingredients, is preferable for the invention, because it has an enhanced effect on preventing a lowering of the temperature coefficient of resistance. Glass containing ZnO and $B_2O_3$ as main ingredients has its softening point so easily controlled to somewhere between 550° C. and 750° C., as desired. In this preferable softening point range from 550° C. to 750° C., the sensor element that is heated to about 200° C. to about 400° C. during use is improved in terms of thermal shock resistance, because the transition point of the glass can be increased to higher than the temperature at which the sensor element is used. Experimentation indicated that any degradation of the temperature coefficient of resistance of a thin platinum film is not found at all, if the melting temperature of the glass for forming the protective layer is higher than the softening point of the glass by at most 200° C., preferably 150° C. Such a wide range of melting temperature makes it considerably easy to fabricate sensor elements.

The enhanced effect on preventing a lowering of the temperature coefficient of resistance seems to be obtained primarily because of the fact that ZnO is a more stable oxide in comparison with $Na_2O$ and $K_2O$ (ZnO, it is more unstable than $SiO_2$ and $Al_2O_3$); ZnO is unlikely to decompose at the grain boundaries in the thin platinum film; ZnO prevents $Na_2O$, $K_2O$, etc., from contacting the thin platinum film; Zn formed by the decomposition of ZnO does not form any solid solution with platinum; and $Na_2O$ and $K_2O$ form a difficult-to-decompose atmosphere due to the presence of $O_2$ formed by the decomposition of ZnO. $B_2O_3$ is a component that has a relatively low softening point and, when somewhat heated, gives fluidity to glass. $B_2O_3$, because of these effects, plays a role in enhancing the effect of ZnO on preventing malfunction of a sensor element.

coefficient of resistance of 3,600 ppm/° C. or higher. In FIG. 1, reference numeral 1 stands for the wire, 2 the mixed paste, 3 the alumina pipe and 4 the spirally formed, thin platinum film.

Then, a glass paste for the protective coating was prepared. After being regulated to a mean particle diameter of about 1 μm, the raw glass powders were mixed with an organic binder and a solvent in a mortar. After being regulated in terms of viscosity, the glass paste mixture was uniformly coated on the thin platinum film, dried and fired under predetermined conditions. The thickness distribution of the glass comprised 70% of 10-30 μm and 100% of 5-50 μm.

The glass-coated sensor element is schematically shown in FIG. 2. In FIG. 2, reference numeral 6 stands for the glass protective layer. In order to make the thickness of the glass protective layer uniform, it is preferable that the glass is coated and fired twice or more. In this case, the first and second glass layers may be formed of different types of glass. For instance, the second layer may be formed of glass containing much Na.

Differences $\Delta\alpha$ in the temperature coefficients of resistance, $\alpha$ in ppm/° C., of various glass compositions, as measured before and after the formation of the glass protective layer, are set out in Table 1, for each melting temperature.

TABLE 1

| Ex. | Composition (mol %) | | | | Other Main Components | Softening Point (°C.) | Transition Point (°C.) | $\Delta\alpha$ (ppm/°C.) Melting Temperature (Softening Point +°C.) | | | Change in $\alpha$ in on-off 100 hours Durability Testing n = 5 |
|---|---|---|---|---|---|---|---|---|---|---|---|
| | ZnO | $B_2O_3$ | $Na_2O$ | $K_2O$ | | | | 0-100 | 100-150 | 150-200 | |
| A | 46 | 20 | 0.7 | 0.1 | CaO | 610 | 520 | 7, 4 | 8, 3 | 9, 1 | ≦ ±5 ppm/°C. |
| | 66 | | 0.8 | | $Al_2O_3$ | | | 4, 0 | 0, 0 | −1, −1 | |
| | | | | | $SiO_2$ | | | −5, −6 | −9, −13 | −20, −35 | |
| B | 52 | 24 | 1.0 | 0.7 | $SiO_2$ | 670 | — | 3, 2 | −1, −3 | −15, −35 | ≦ ±5 ppm/°C. |
| | 76 | | 1.7 | | MgO | Crystal- | | 0, 0 | −10, −10 | −36, −39 | |
| | | | | | | lization | | 0, −2 | −13, −17 | −44, −48 | |
| C | 10 | 7 | 0.3 | 0.4 | $SiO_2$ | 740 | 660 | 15, 13 | 25, 18 | 15, 7 | ≦ ±5 ppm/°C. |
| | 17 | | | 0.7 | $Al_2O_3$ | | | 3, 2 | 15, 14 | 0, −6 | |
| | | | | | MgO | | | 2, −5 | 0, 0 | −13, −23 | |
| | | | | | BaO | | | | | | |

EXAMPLES

The invention will now be explained at great length, but not exclusively, with reference to some examples.

An alumina pipe of 0.35 mm in inner diameter and 0.5 mm in outer diameter was provided on the outer surface with a thin platinum film of about 0.5 μm by sputtering. After being heat treated at a temperature higher than 700° C., the thin platinum film was spirally trimmed by laser to a given resistance. Then, a platinized stainless wire of 0.22 mm in diameter was cut to a given length, inserted through the ends of the alumina pipe and fixed there with a mixed paste of platinum with glass, followed by firing at a given temperature conforming to the glass in the mixed paste (that is a temperature equal to or higher than the melting temperature of the protective layer).

The thus obtained sensor element, as schematically shown in FIG. 1, was found to have a temperature It is noted that $\alpha$ is defined by $$R_T = R_0(1 + \alpha T + \beta T^2)$$

where $R_T$ is the resistance value (in Ω) of the sensor element at a temperature T° C., T is the temperature (in ° C.) of the atmosphere, $R_0$ is the resistance value (in Ω) at 0° C., $\alpha$ is the coefficient of the primary term of T and $\beta$ is the coefficient of the secondary term of T.

The sensor elements were subjected to 100 hours of durability testing where they were electrically heated at room temperature +400° C. for 5 minutes and cooled by cold air for 5 minutes after the interruption of electrical heating. The results or the amounts of change in the temperature coefficient of resistance $\alpha$ are set out in Table 1.

FIG. 3 provides a graphical representation illustrating the relation between the total $Na_2O$ and $K_2O$ content in the glass and the amounts of change, $\Delta\alpha$, in the temperature coefficient of resistance after and before the formation of the protective layer. The basic glass composition used was that referred to in Example A in Table 1, where n represents the number of data or, in the invention, n=6 per each point.

FIG. 4 indicates the relation between the amounts of $ZnO + B_2O_3$ in the glass and the softening point of the glass in Examples A, B and C as well as in other glass compositions that lie in the range of the invention, and teaches that, especially in the range illustrated, $Na_2O$ and $K_2O$ have little influence on the temperature coefficient of resistance. Softening point regulation may optionally be done by the addition of other glass components such as $SiO_2$, CaO, $Al_2O_3$, MgO and BaO. The incorporation of PbO in a small amount had no influence on the temperature coefficient of resistance. However, the incorporation of PbO in an amount as large as 30 mol %, for instance, is not preferable, because it is reduced depending on the glass melting temperature and atmosphere giving rise to discoloration of the glass and a lowering of the temperature coefficient of resistance, and so it requires strict control of heat treatments under strict control.

These results reveal that the sensor element has a high yet stable resistance value and a large yet stable temperature coefficient of resistance, is excellent in durability and is less likely to vary depending on production conditions, and so can be fabricated easily.

As explained above, the present invention successfully provides a sensor element for a thermal type flowmeter, which has a resistance value capable of being increased, as desired, and a large yet stable temperature coefficient of resistance and can be easily fabricated.

We claim

1. A sensor element for a thermal flowmeter, comprising a ceramic substrate, a thin film resistor of platinum provided on an outer surface of said ceramic substrate, and an outer protective layer of glass provided for protecting said resistor, wherein said glass has a softening point of 550° C. to 750° C. and comprises ZnO and $B_2O_3$ as main ingredients, and $Na_2O$ and $K_2O$ in a total amount of up to 3 mol %.

2. The sensor element of claim 1, wherein said protective layer has a thickness of 5 $\mu$m to 50 $\mu$m.

* * * * *